United States Patent [19]

Kepner

[11] Patent Number: 5,394,341
[45] Date of Patent: Feb. 28, 1995

[54] APPARATUS FOR DETECTING THE FAILURE OF A SENSOR

[75] Inventor: Charles M. Kepner, Walled Lake, Mich.

[73] Assignee: Ford Motor Company, Dearborn, Mich.

[21] Appl. No.: 37,157

[22] Filed: Mar. 25, 1993

[51] Int. Cl.⁶ .................. G06F 15/20; G06F 15/46
[52] U.S. Cl. .................. 364/551.01; 364/550; 324/537
[58] Field of Search .............. 364/550, 551.01, 481, 364/483; 324/537, 538, 549; 340/650, 652, 653, 654, 661; 341/118

[56] References Cited

U.S. PATENT DOCUMENTS

| | | | |
|---|---|---|---|
| 4,336,593 | 6/1982 | Takase | 364/431.12 |
| 4,337,516 | 6/1982 | Murphy et al. | 364/551.01 |
| 4,920,939 | 5/1990 | Gale | 324/549 X |
| 5,016,186 | 5/1991 | Toyoda et al. | 364/550 X |
| 5,025,259 | 6/1991 | Abe | 341/118 |
| 5,235,527 | 8/1993 | Ogawa et al. | 364/551.01 X |

Primary Examiner—Ellis B. Ramirez
Assistant Examiner—Melanie Kemper
Attorney, Agent, or Firm—Kevin G. Mierzwa; Roger L. May

[57] ABSTRACT

An apparatus to detect the failure of sensor is comprised of a microprocessor which reads sensor values. If the sensor values exceed the inherent noise level and exceed the maximum mechanical change in the system that portion of the signal is counted as noise. If the noise count exceeds a predetermined count, indicator signals the sensor is bad.

3 Claims, 2 Drawing Sheets

APPARATUS FOR DETECTING THE FAILURE OF A SENSOR

BACKGROUND OF THE INVENTION

The invention relates generally to monitoring electrical sensors and more specifically to a method and apparatus for predicting the failure of a resistive-type automotive sensor.

Resistive sensors are used in many applications on automobiles. Manual lever position sensors, fuel injection pump levers, exhaust gas recirculation sensors, and throttle position sensors are frequently of the resistive type. By example, the throttle position sensor, typically mounted on the engine, provides feedback to the engine control module in the form of an analog signal proportional to the position of the throttle. The throttle position sensor is typically a potentiometer-type sensor having a thin-film resistive coating on a substrate. A wiper is mechanically coupled to the throttle and sweeps the resistive coating. The wiper position corresponds to the relative throttle position such that a change in the throttle position effectuates a corresponding change in the wiper voltage.

In operation, the wiper utilizes certain portions of the sensor more regularly than others (e.g., the cruising position or idle). Consequently, the wiper thins the resistive coating in such areas and eventually may wear the coating off the substrate. If a sensor reading is taken from a worn portion of the coating, noise is imposed on the throttle position sensor signal. When the sensor first starts to wear, only small noise spikes are imposed on the signal and a change in the performance of the powertrain (i.e., the engine and the transmission) is imperceivable by the vehicle operator. However, over time, the magnitude of the noise spikes generated will increase, resulting in the degradation of the performance of the powertrain. For example, noise spikes may cause an electronic transmission to prematurely shift gears.

One method for discriminating between noisy and noise-free signals is described in U.S. Pat. No. 4,336,593. A discriminator is used to determine if a sensor signal is outside a predetermined range. The signals are not passed to the register or the microcomputer until they are within the predetermined range. Because only selected values are sent to the processing unit, a response delay is created in the system. It is believed that if such a system were implemented to process the throttle position sensor signal, there would be a noticeable degradation in the system performance since signals which correspond to worn portions of the sensor would not be passed until a non-noisy signal value was received. The result would be a sudden step in the throttle voltage. Also, the system will pass noise that falls within the acceptable range. Over time the sensor and powertrain performance would continue to deteriorate. Therefore, such a system is not desirable for use in detecting throttle position sensor wear.

It is desirable to detect the degradation of a throttle position sensor before damage to the powertrain occurs and the performance of the powertrain is reduced to a point where it can be perceived by the vehicle operator, thereby allowing corrective measures at the earliest possible time.

Since the underhood environment is inherently noisy, it is also be desirable to discriminate between underhood electrical noise and noise from the worn sensor.

SUMMARY OF THE INVENTION

It is therefore an object of the present invention to provide a system which will indicate when the throttle position sensor begins to deteriorate by detecting noise generated by the sensor so that corrective action can be taken before a noticeable degradation in powertrain performance occurs.

Because the slope of the noise signal (i.e., the rate of change of the noise signal) exceeds possible mechanical rate of change of the system, the noise spikes are distinguishable from the true signal. The rate of change of a signal can be determined by subtracting successive sensor samples taken at regular intervals. Briefly, a preferred embodiment of the present invention includes a memory and a sampling means for obtaining a first, second and third value from the sensor at regular intervals and storing them in the memory. A differential means calculates a first difference between the second value and the first value and a second difference between the third value and the second value. The system further includes a comparison means for comparing the first difference and the second difference each with a predetermined value indicative of a noise threshold, a counter means for counting the number of comparisons having noise, and an indicator means for indicating if the count exceeds a predetermined value.

One advantage of the system is that a threshold can be set so the inherent noise of the system will not be mistaken for noise coming from the sensor.

DETAILED DESCRIPTION OF THE PREFERRED EMBODIMENT

Figure 1:
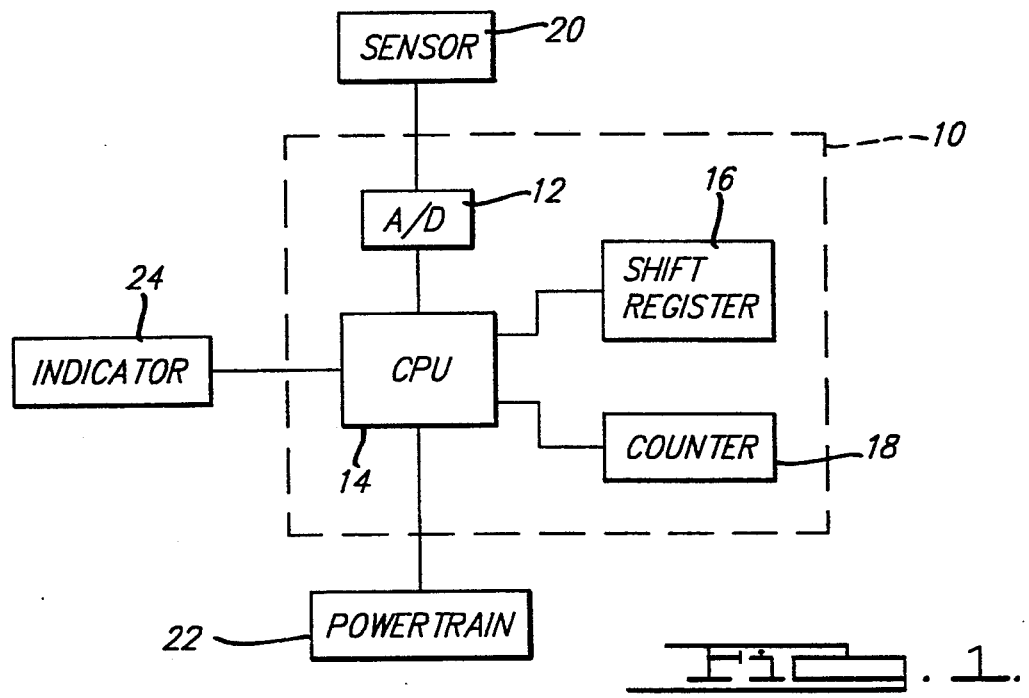
FIG. 1 is a block diagram of a preferred embodiment of the apparatus.

Referring now to FIG. 1, the apparatus includes a microprocessor 10, a sensor 20, a powertrain 22, and an indicator 24. Microprocessor 10 includes an analog-to-digital convertor (A/D) 12, a central processing unit (CPU) 14, a shift register 16, and a counter 18.

Sensor 20 is of the resistive-type (e.g., a thin-film throttle position sensor) which upon deterioration exhibits noise on its analog output signal. The analog output signal of sensor 20 is converted into a digital signal by A/D 12. CPU 14 controls the function of powertrain 22 in addition to sampling the digital signals from A/D 12 at regular intervals. The sampled values are stored in memory locations of shift register 16 which can be volatile memory such as RAM.

CPU 14 determines if the signal from the sensor is a noise spike or an actual signal by counting the number of noise spikes as described in connection with FIG. 2. Counter 18 stores a count of the number of noisy samples. If the counter number exceeds a predetermined value, indicator 24 signals that the sensor is faulty. Indicator 24 can be a dash-mounted indicator light or service memory error code which is a flag set in the microprocessor.

Figure 2:
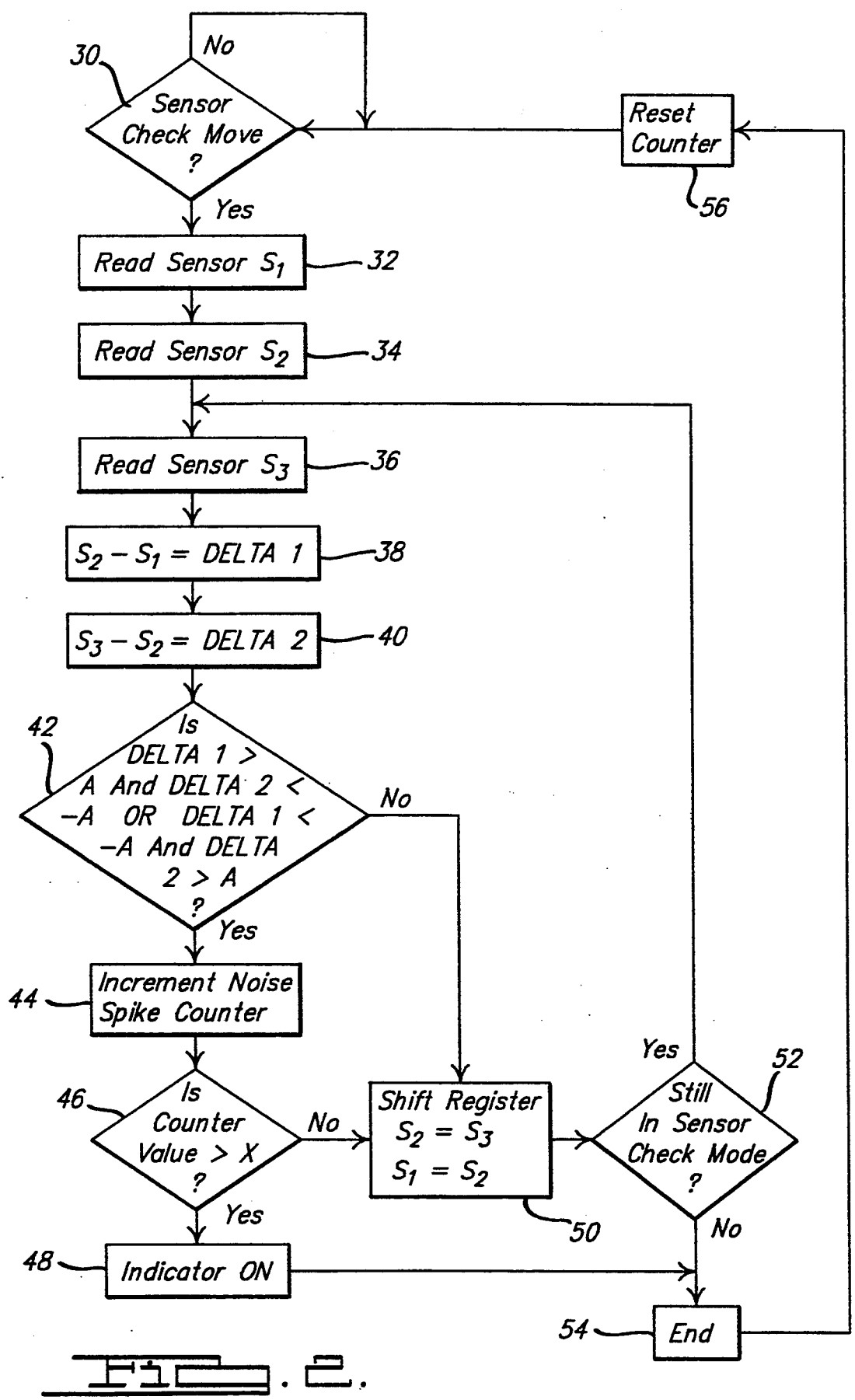
FIG. 2 is a flowchart of a preferred method of detecting noise.

Referring now to FIG. 2, the CPU enters a sensor check mode in step 30 after the engine is started. Check mode can be a continual check or can be a check signalled by the microprocessor at predetermined intervals based on time or miles of operation. When the sensor enters the check mode, the CPU takes a fixed number of samples at regular intervals. For example, in one application, a sample rate of 0.010 to 0.030 seconds was used, however, this number depends on the characteristics of the system. The first three samples of the sensor (S1, S2 and S3) are taken in steps 32, 34 and 36, respectively. The CPU calculates the difference (S2-S1) in step 38 to yield Delta1 and calculates the difference (S3-S2) in step 40 to yield Delta2.

Noise in the sensor is characterized by the signal changing too rapidly (i.e., exceeding the mechanical limits of the system) and by the signal exceeding the inherent noise level in the system. The tolerable threshold value of noise which will not, for example, effect the transmission shift characteristics is represented by a value A which will vary depending on the individual system. Step 42 uses the following formula to determine if the sensor is emitting noisy signals:

If (Delta1 > A AND Delta2 < −A) OR
(Delta1 < -A AND Delta2 > A)
then the sensor is generating noise.

If a noise spike is found, the noise spike counter is incremented in step 44. If the counter value exceeds a predetermined number (X) in step 46, the indicator informs the vehicle operator that the sensor is faulty as in step 48. For example, a count value of less than 10 noise spikes per hundred samples is acceptable. If the system is particularly sensitive to noise, count values as low as 2 to 4 noise spikes per hundred samples may be used. Sensor testing is then ended in step 54. If the counter value in step 46 is not exceeded, the shift register in step 50 replaces the memory value of S1 with the S2 value and replaces the S2 value with the S3 value. Step 52 checks to see if the system is still in check mode (defined by a predetermined number of samples, for example 100). if the predetermined number of samples have been obtained or the vehicle falls below a predetermined speed, then the process ends in step 54. If the system is still in check mode (i.e., enough sensor samples have not been taken) the system will sample a new S3 value in step 36. When the check mode ends, the counter memory is reset in step 56. The system will then proceed to the beginning of the process and enter another check mode in step 30.

Figure 3:
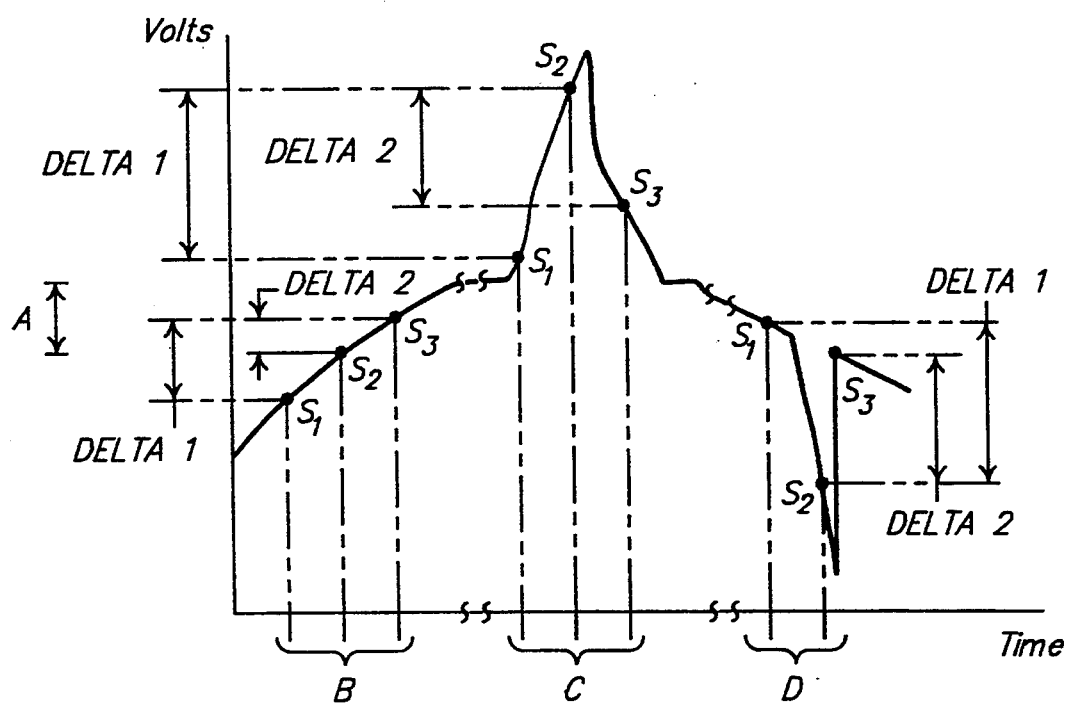
FIG. 3 is a plot of a portion of the output voltage of a throttle position sensor.

FIG. 3 is a plot of the output voltage of the throttle position sensor versus time. The portion B does not have noise present. For portion B, the signal is sampled at regular intervals S1, S2 and S3. Delta1 (S2-S1) is greater than the threshold value A and Delta2 (S3-S2) is smaller than the noise threshold A. Thus, portion B will not be counted as noise. In portions C and D, a noise spike is present. Portion C will be counted as a spike because Delta1 is greater than A and Delta 2 is less than −A. Portion D will also be counted as a spike because Delta1 is less than −A and Delta2 is greater than A.

What is claimed is:

1. An apparatus for detecting the degradation of a sensor comprising:

a memory;

sampling means for obtaining a first, second and third value from said sensor at regular intervals and storing them in said memory;

differential means for calculating a first difference between said second value and said first value to obtain a first slope and a second difference between said third value and said second value to obtain a second slope;

comparison means for comparing said first difference and said second difference each with a positive and negative predetermined value to detect a noise spike, said predetermined value corresponding to a slope of a noise spike;

counter means for incrementing a count in response to each detected noise spike during a predetermined number of comparisons; and indicator means for indicating sensor degradation if the count exceeds a predetermined value.

2. The apparatus of claim 1 wherein the counter means indicates noise when:

(Delta1 > A AND Delta2 < −A) OR
(Delta1 < −A AND Delta2 > A)

where Delta1 = said first slope
Delta2 = said second slope and
A = said predetermined value.

3. The apparatus of claim 1 wherein said memory is a shift register.

* * * * *